US011977223B2

(12) United States Patent
Morinaga et al.

(10) Patent No.: US 11,977,223 B2
(45) Date of Patent: *May 7, 2024

(54) OPTICAL UNIT (71) Applicant: HAMAMATSU PHOTONICS K.K., Hamamatsu (JP)

(72) Inventors: Yuki Morinaga, Hamamatsu (JP); Anna Yoshida, Hamamatsu (JP); Yoshihisa Warashina, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,572

(22) Filed: Jan. 31, 2023

(65) Prior Publication Data
US 2023/0168494 A1 Jun. 1, 2023

Related U.S. Application Data (63) Continuation of application No. 17/722,757, filed on Apr. 18, 2022, now Pat. No. 11,598,951, which is a (Continued)

(30) Foreign Application Priority Data

Jan. 30, 2019 (JP) ................................. 2019-014610

(51) Int. Cl.
*G02B 26/08* (2006.01)
*G02B 26/10* (2006.01)
*G02B 27/00* (2006.01)

(52) U.S. Cl.
CPC ..... *G02B 27/0031* (2013.01); *G02B 26/0833* (2013.01); *G02B 26/085* (2013.01);
(Continued)

(58) Field of Classification Search
CPC ............ G02B 27/0031; G02B 26/0833; G02B 26/085; G02B 26/10; G02B 26/101; G02B 27/0006
See application file for complete search history.

(56) References Cited

U.S. PATENT DOCUMENTS 6,295,154 B1 * 9/2001 Laor ..................... G02B 26/085
359/872
10,459,218 B2 10/2019 Suzuki et al.
(Continued)

FOREIGN PATENT DOCUMENTS

JP 2007-034309 A 2/2007
JP 2007-524112 A 8/2007
(Continued)

OTHER PUBLICATIONS

Kosuke Ushiro et al., "Development and Verification for Next Generation System of Surrounding Environment Recognition Technology—Third Report: System Architecture of MEMS Scanning 3D Range Sensor-," JARI Research Journal Nov. 3, 2017, Nov. 2017 (w/partial English translation).
(Continued)

*Primary Examiner* — Euncha P Cherry
(74) *Attorney, Agent, or Firm* — Faegre Drinker Biddle & Reath LLP (57) ABSTRACT

An optical unit includes: a base which includes a main surface; a mirror device which includes a movable mirror portion and is disposed on the base; a frame member that is provided on the main surface so as to surround the mirror device; and a window member that is bonded to the frame member and has a flat plate shape. The frame member includes a first wall portion which is provided on the main surface and includes a first top surface on the side opposite to the main surface, a second wall portion which is provided
(Continued)

on the main surface so as to face the first wall portion and includes a second top surface on the side opposite to the main surface.

15 Claims, 6 Drawing Sheets

Related U.S. Application Data continuation of application No. 16/752,941, filed on Jan. 27, 2020, now Pat. No. 11,333,882.

(52) U.S. Cl.
CPC ............ *G02B 26/10* (2013.01); *G02B 26/101* (2013.01); *G02B 27/0006* (2013.01)

(56) References Cited

U.S. PATENT DOCUMENTS

| | | | |
|---|---|---|---|
| 11,372,238 B2 | 6/2022 | Suzuki et al. | |
| 11,592,662 B2 | 2/2023 | Suzuki et al. | |
| 11,598,951 B2* | 3/2023 | Morinaga | G02B 26/085 |
| 2007/0024549 A1 | 2/2007 | Choi et al. | |
| 2009/0097087 A1 | 4/2009 | Wolter et al. | |
| 2010/0014147 A1 | 1/2010 | Pinter et al. | |
| 2015/0200105 A1 | 7/2015 | Langa et al. | |
| 2016/0356984 A1* | 12/2016 | Horie | G02B 26/0858 |

FOREIGN PATENT DOCUMENTS

| | | |
|---|---|---|
| JP | 2008-183636 A | 8/2008 |
| JP | 2013-246361 A | 12/2013 |
| JP | 2017-215352 A | 12/2017 |
| JP | 2018-017859 A | 2/2018 |
| JP | 2018-037582 A | 3/2018 |
| JP | 2018-132741 A | 8/2018 |
| WO | WO 2004/106221 A2 | 12/2004 |
| WO | WO 2019/012787 A1 | 1/2019 |

OTHER PUBLICATIONS

Hamamatsu Product Flyer 1, "MEMS mirror S13124-02H," pp. 1-4, Jan. 30, 2018.
Hamamatsu Product Flyer 2, "MEMS mirror S13989-01H," p. 1-2, Jan. 30, 2018.

* cited by examiner

OPTICAL UNIT

CROSS-REFERENCE TO RELATED APPLICATIONS

This application is a continuation of U.S. patent application Ser. No. 17/722,757, filed Apr. 18, 2022, which is a continuation of U.S. patent application Ser. No. 16/752,941, filed Jan. 27, 2020, now, U.S. Pat. No. 11,333,882, issued May 17, 2022, which claims the benefit of priority to Japanese Patent Application No. 2019-014610, filed Jan. 30, 2019, the contents of each of which is incorporated herein by reference.

TECHNICAL FIELD

The present disclosure relates to an optical unit.

BACKGROUND

An optical scanner package is disclosed in Patent Literature 1 (Japanese Unexamined Patent Publication No. 2018-17859). This optical scanner package includes a base substrate, a frame member, and a flat glass. The base substrate includes a substrate and a mirror member. A surface of the substrate is provided with a convex portion and a recess. The mirror member is provided so as to block this recess. The frame member and the flat glass constitute a cover member and are bonded to the convex portion so as to be integrated with the base substrate. Accordingly, the mirror member is sealed. Further, an MEMS mirror package is disclosed in Non Patent Literature 1 (Kosuke USHIRO, Hideo NAKAMURA, "Development and Verification for Next Generation System of Surrounding Environment Recognition Technology", [online], JARI Research Journal 20171103, [Search Dec. 24, 2019], Internet <http://www.jari.or.jp/Portals/0/resource/JRJ_q/JRJ20171103_q.pdf>).

SUMMARY

In the above-described optical scanner package, light which is incident from the flat glass is reflected by a mirror of the mirror member and the reflected light is emitted through the flat glass. Here, the flat glass is inclined with respect to a mirror surface. Accordingly, the traveling direction of noise light generated by the reflection on the flat glass is separated from the traveling direction of the reflected light. As a result, the influence of the noise light on the scan of the reflected light due to the swing of the mirror is suppressed. In this way, in the above-described technical field, suppression of noise is desired. On the other hand, in the above-described technical field, improvement in reliability is also desired.

Therefore, an object of the present disclosure is to provide an optical unit capable of improving reliability while suppressing noise.

DETAILED DESCRIPTION

[Description of Embodiment of Present Disclosure]

First, embodiments of the present disclosure will be listed and described.

An optical unit according to the present disclosure includes: a base which includes a main surface; a mirror device which includes a movable mirror portion and is disposed on the base; a frame member that is provided on the main surface so as to surround the mirror device; and a window member that is bonded to the frame member and has a flat plate shape, in which the frame member includes a first wall portion which is provided on the main surface and includes a first top surface on the side opposite to the main surface, a second wall portion which is provided on the main surface so as to face the first wall portion and includes a second top surface on the side opposite to the main surface, and a third wall portion which is provided on the main surface so as to connect the first wall portion and the second wall portion to each other at both ends of the first wall portion and both ends of the second wall portion and includes a third top surface, in which a height of the first wall portion from the main surface is set to be lower than a height of the second wall portion from the main surface, in which the window member is connected to at least the first top surface and the second top surface and is inclined such that a distance from the main surface increases from the first wall portion to the second wall portion, in which the first top surface, the second top surface, and the third top surface are inclined at an angle corresponding to the inclination of the window member, in which a thickness of the window member is thicker than a minimum value of the height of the first wall portion from the main surface, and in which a length of the first top surface in a first direction from the first wall portion toward the second wall portion is longer than the minimum value.

In the optical unit, the window member that provides the light entrance/exit portion is inclined such that a distance from the main surface of the base decreases from the second wall portion of the frame member supporting the window member to the first wall portion. Thus, noise light generated by the reflection in the window member is difficult to affect the scan of the reflected light in the movable mirror portion and noise is suppressed. Meanwhile, in such an optical unit, it is advantageous that the movable mirror portion (the mirror surface) is as large as possible. However, when the movable mirror portion is large, the size of the mirror device increases and hence the size of the frame member surrounding the mirror device also increases. When the window member and the frame member are large while maintaining the inclination angle of the window member inclined from the viewpoint of suppressing noise, a difference in height between the first wall portion and the second wall portion increases. Then, since the balance of the strength of the frame member becomes poor, there is concern that the strength is deteriorated as a whole.

In contrast, in the optical unit, the window member that is thicker than the minimum value of the height of the first wall portion is bonded to the frame member so that the balance of the strength is maintained as a whole and deterioration of strength is suppressed. Further, in the optical unit, the length of the top surface (the first top surface) of the first wall portion in the first direction from the first wall portion toward the second wall portion is set to be longer than the minimum value of the height of the first wall portion. Accordingly, it is possible to suppress the first wall portion from being deformed such that both ends corresponding to the connection portions with the third wall portion in the first wall portion or the center portion between both ends of the first wall portion is displaced in the first direction. Further, the window member that is thicker than the minimum value of the height of the first wall portion is bonded to the first wall portion (the frame member) so that the deformation of the first wall portion in the height direction is also suppressed. For at least the above-described reasons, the optical unit also improves the reliability.

In the optical unit according to the present disclosure, a length of a portion bonded to the window member in the first top surface in the first direction may be longer than the minimum value. In this case, it is possible to further suppress the first wall portion from being deformed such that both ends corresponding to the connection portions with the third wall portion in the first wall portion or the center portion between both ends of the first wall portion is displaced in the first direction. Thus, the reliability is further improved.

In the optical unit according to the present disclosure, a length of a portion bonded to the window member in the first top surface in the first direction may be shorter than a length of the entirety of the first top surface in the first direction. In this case, since a marginal portion (not contacting the window member) not forming a joint with the window member occurs in a relatively low portion of the first wall portion, the damage of the first wall portion is suppressed. Thus, the reliability is further improved.

In the optical unit according to the present disclosure, the main surface may be provided with a concave portion in which the mirror device is disposed when viewed from a second direction intersecting the main surface and a corner portion of the concave portion may be curved when viewed from the second direction. In this case, stress applied from the frame member to the base and stress applied from the base to the mirror device are relaxed. Thus, the reliability is further improved.

In the optical unit according to the present disclosure, a portion on the side of the window member in an inner surface of the frame member and an outer surface of the window member may be provided with a fillet of a bonding material between the frame member and the window member. In this case, a deviation between the frame member and the window member is suppressed in the extension direction of the joint portion between the frame member and the window member. Thus, the reliability is further improved.

In the optical unit according to the present disclosure, a length of a bottom surface facing the main surface in the first wall portion in the first direction may be longer than the minimum value. In this case, it is possible to further suppress the first wall portion from being deformed such that both ends corresponding to the connection portions with the third wall portion in the first wall portion or the center portion between both ends of the first wall portion is displaced in the first direction.

According to the present disclosure, an optical unit capable of improving reliability while suppressing noise is provided.

[Detail of Embodiment of Present Disclosure]

Figure 1:
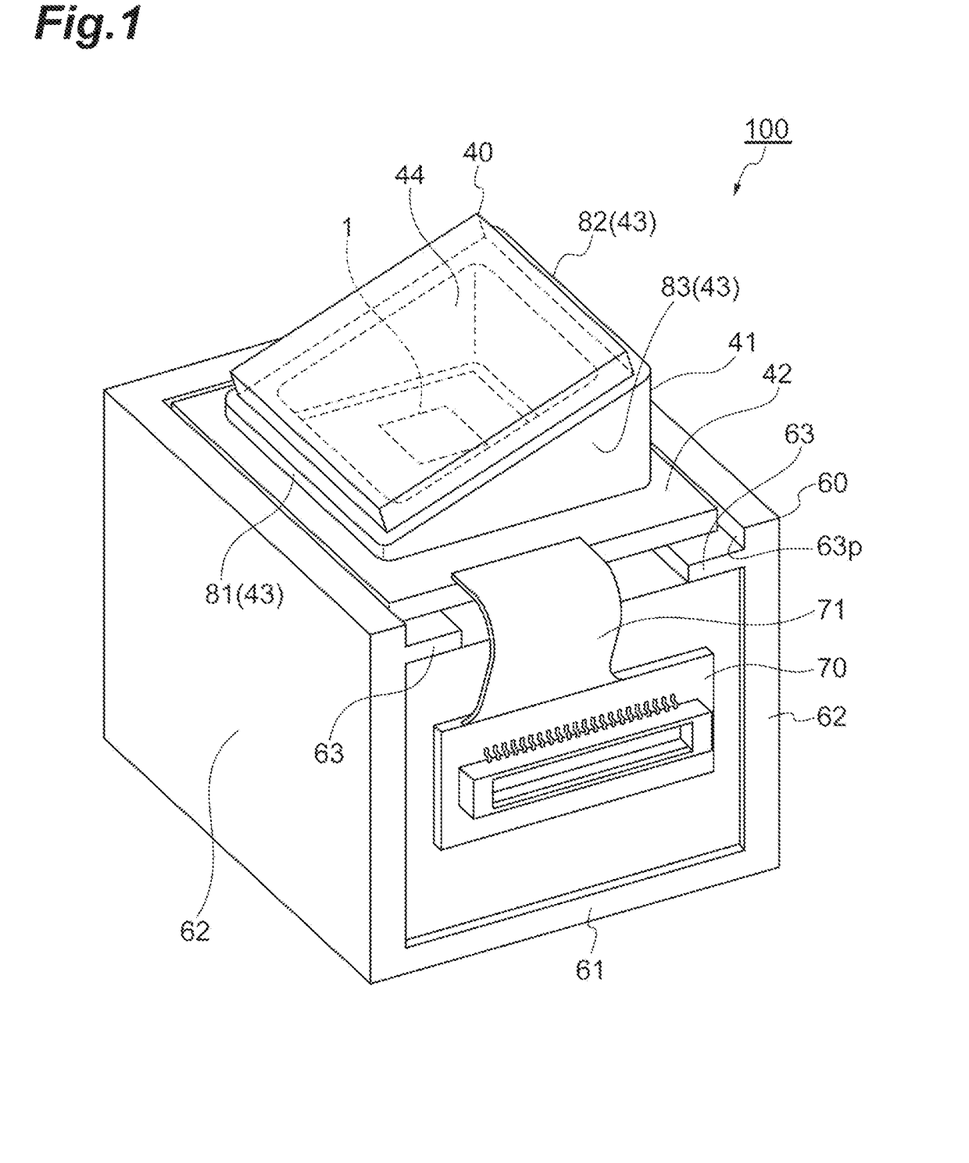
FIG. 1 is a perspective view illustrating an optical module according to the embodiment.
Figure 2:
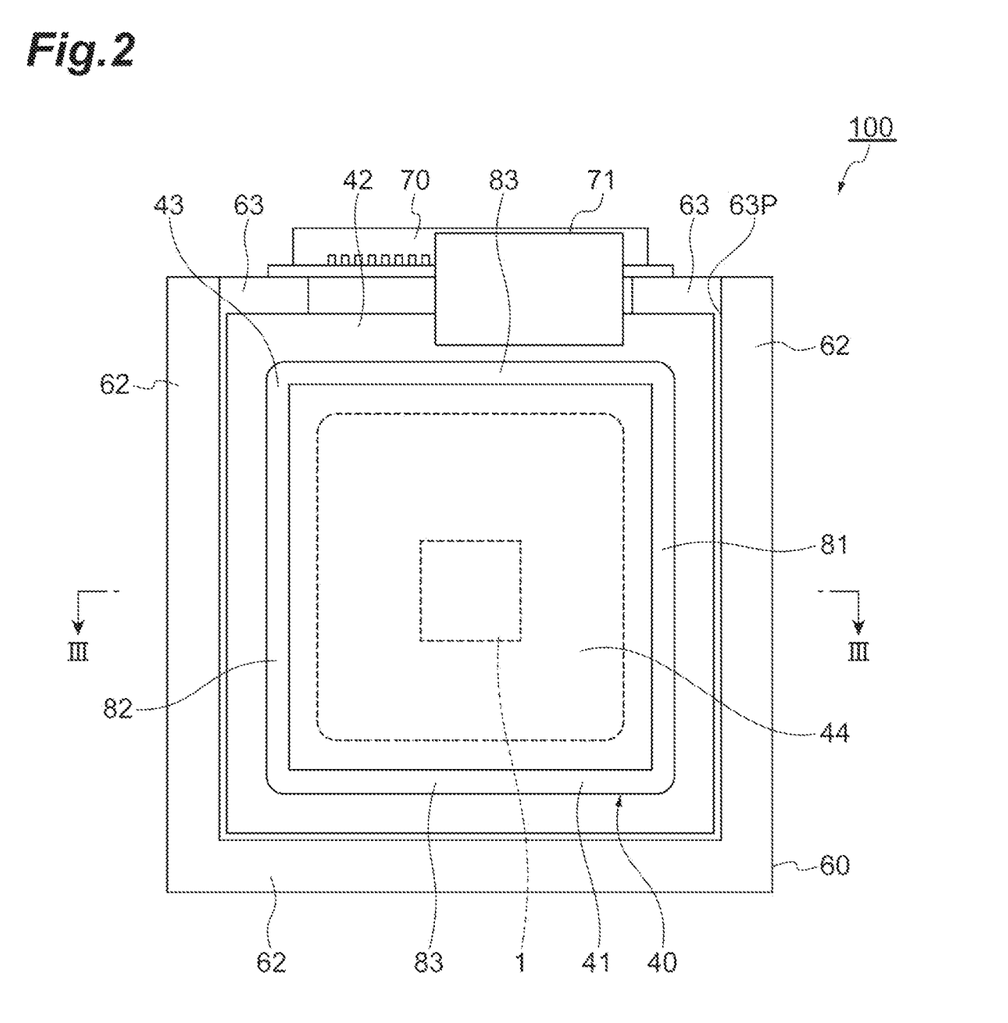
FIG. 2 is a plan view of the optical module illustrated in FIG. 1.
Figure 3:
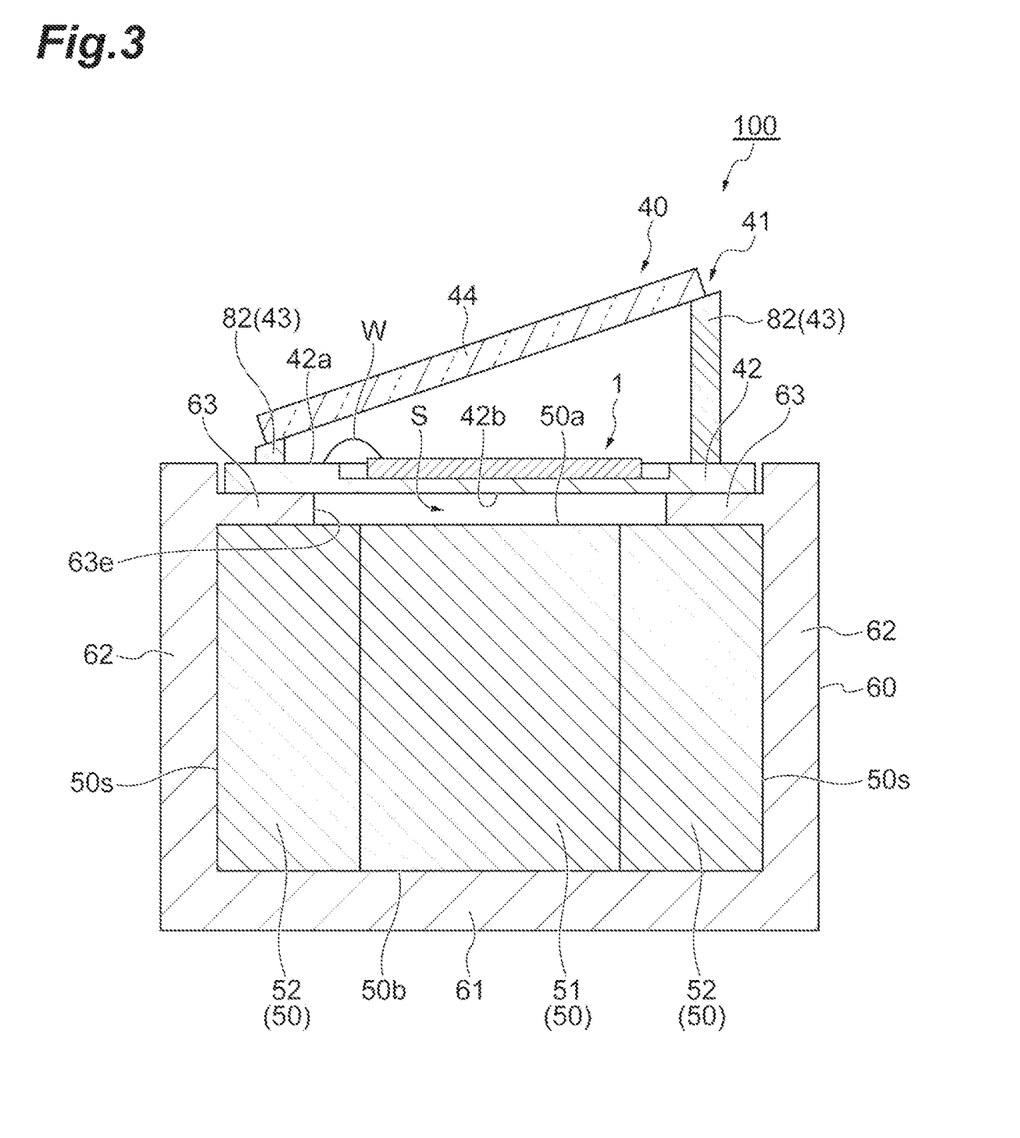
FIG. 3 is a schematic cross-sectional view taken along line III-III of FIG. 2.
Figure 4:
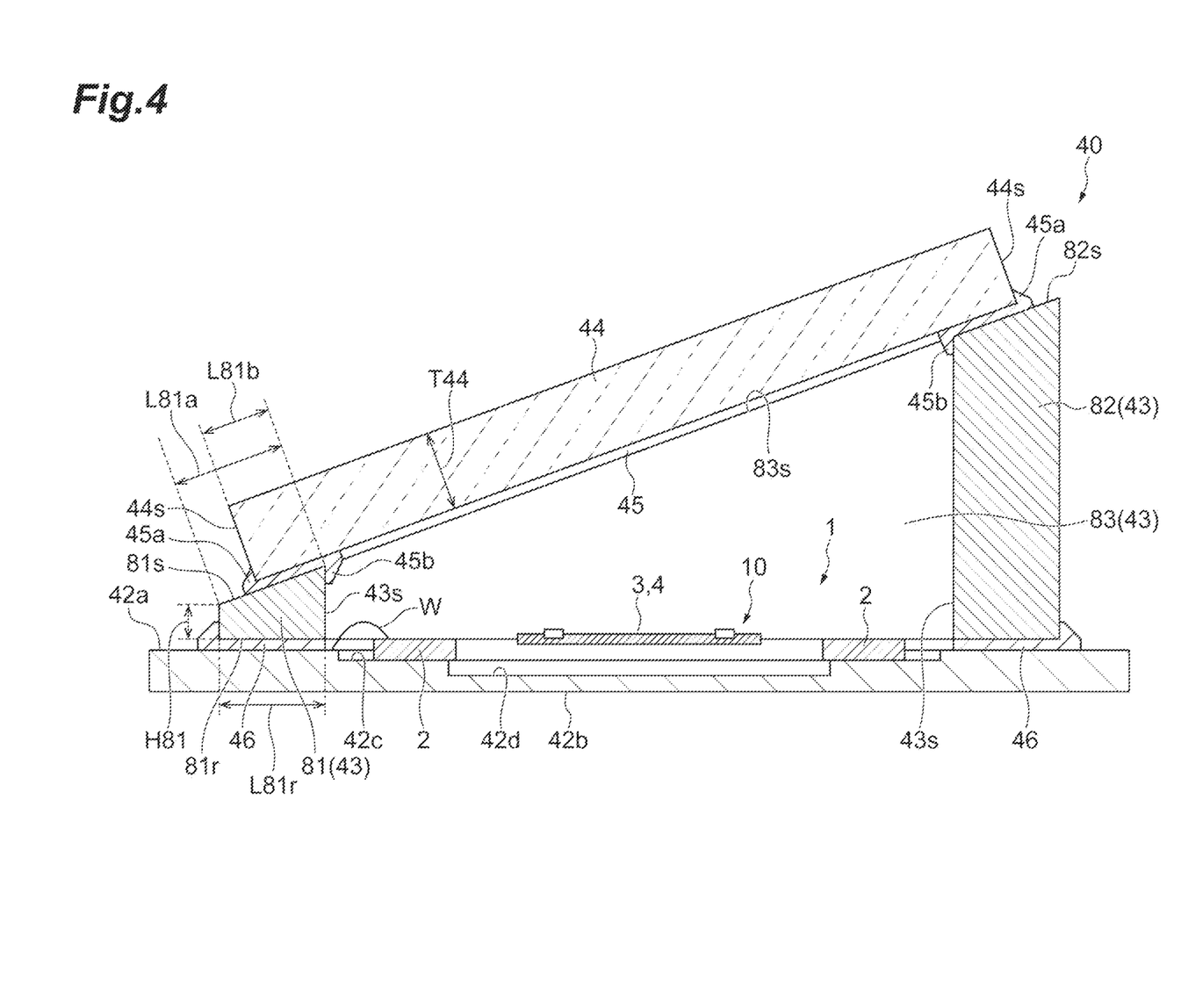
FIG. 4 is a schematic cross-sectional view illustrating a mirror package illustrated in FIG. 3.

FIG. 1 is a perspective view illustrating an optical module according to the embodiment. FIG. 2 is a plan view of the optical module illustrated in FIG. 1. FIG. 3 is a schematic cross-sectional view taken along line III-III of FIG. 2. FIG. 4 is a schematic cross-sectional view illustrating a mirror package illustrated in FIG. 3. An optical module 100 illustrated in FIGS. 1 to 4 includes a mirror unit (an optical unit) 40, a magnet portion 50, and a package 60. The mirror unit 40 includes an electromagnetically driven micro electro mechanical systems (MEMS) mirror (mirror device) 1 and a mirror package 41 accommodating the MEMS mirror 1. The mirror package 41 includes a base 42, a frame member 43, and a window member 44.

The base 42 is formed in a rectangular plate shape by, for example, a nonmagnetic material such as aluminum nitride or aluminum oxide. The base 42 includes a main surface 42a and a back surface 42b on the side opposite to the main surface 42a. The back surface 42b is a surface facing the magnet portion 50 and is a surface forming an outer surface of the mirror package 41. The main surface 42a is a surface forming a part of an inner surface of the mirror package 41. The MEMS mirror 1 is disposed on the main surface 42a.

The frame member 43 is provided on the main surface 42a so as to surround the MEMS mirror 1. The frame member 43 is formed in a rectangular frame shape by, for example, a nonmagnetic material such as aluminum nitride or aluminum oxide. The window member 44 is formed such that an antireflection film is formed on both surfaces of a rectangular flat base formed of, for example, a translucent material such as glass. The window member 44 is bonded to the frame member 43. More specifically, the window member 44 is bonded to the frame member 43 by, for example, a bonding material 45 such as low-melting glass so as to hermetically seal one opening of the frame member 43.

The base 42 is bonded to the frame member 43 by, for example, a bonding material 46 such as low-melting glass so as to seal the other opening of the frame member 43. Accordingly, the MEMS mirror 1 is hermetically sealed by the mirror package 41. The window member 44 and one opening (that is, an opening sealed by the window member 44) of the frame member 43 face the base 42. The base 42 and the frame member 43 may be integrally formed by a nonmagnetic material.

A support portion 2 of the MEMS mirror 1 is attached to the main surface 42a of the base 42 by, for example, resin. The magnet portion 50 is accommodated in the package 60 so as to face the back surface 42b of the base 42. The magnet portion 50 faces a first movable portion 3 of the MEMS mirror 1 through a part of the package 60 and the base 42. Furthermore, the bonding using the bonding materials 45 and 46 may be bonding using, for example, a resin adhesive, a low-temperature solder (Sn/Pb or Sn/Cu-based), a low-temperature brazing material (Au/Sn alloy, Au/Ge alloy or the like), a high-temperature brazing material (Ag-based or the like), projection welding, seam seal welding, laser welding, electron beam welding, or the like other than the bonding using low-melting glass.

Figure 5:
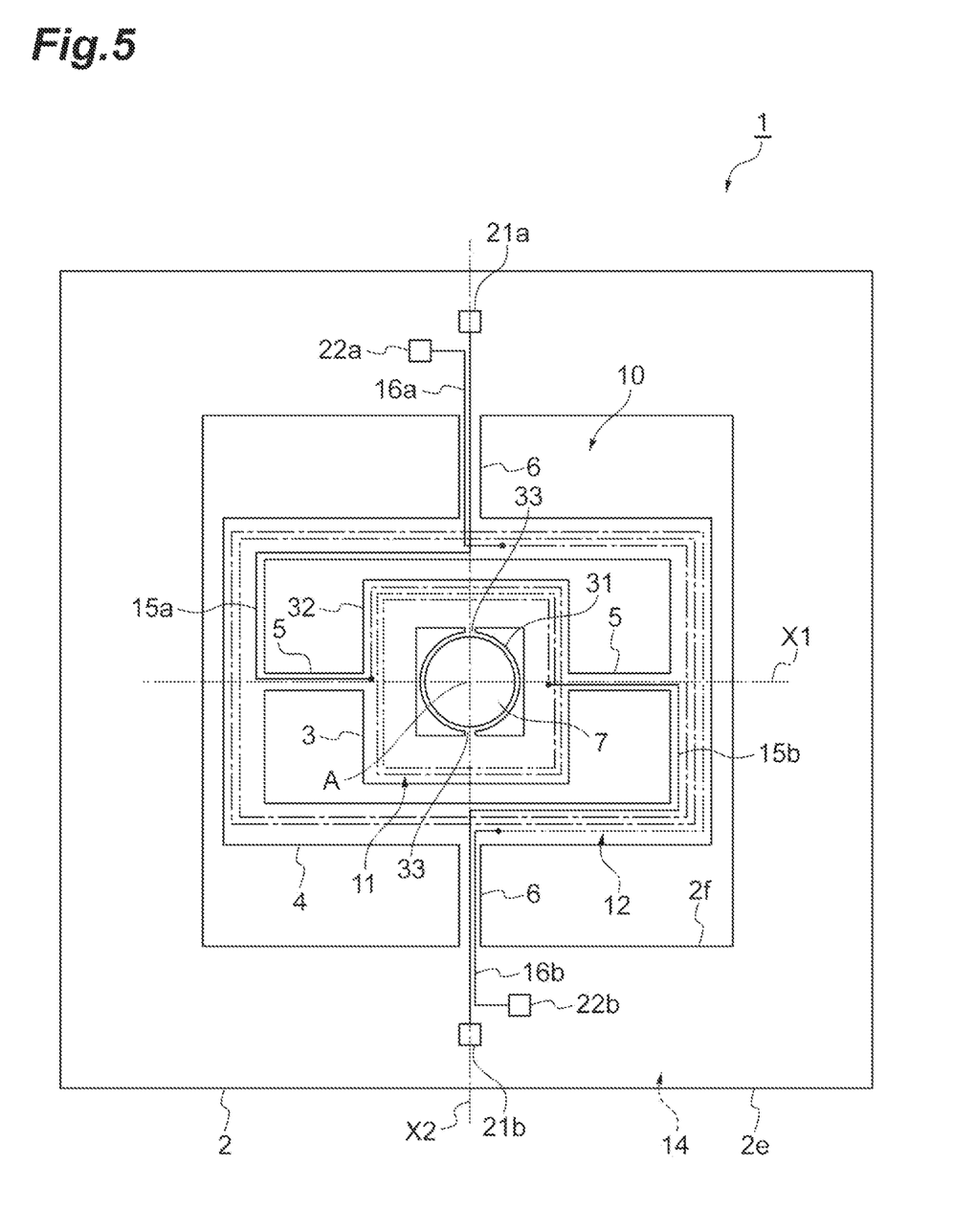
FIG. 5 is a plan view of an MEMS mirror illustrated in FIG. 1.

FIG. 5 is a plan view of the MEMS mirror illustrated in FIG. 1. As illustrated in FIG. 5, the MEMS mirror 1 includes the support portion 2 and a movable mirror portion 10 including the first movable portion (movable portion) 3, a second movable portion (movable portion) 4, a pair of first connecting portions 5, a pair of second connecting portions 6, and a mirror 7. The support portion 2, the first movable portion 3, the second movable portion 4, the pair of first connecting portions 5, and the pair of second connecting portions 6 are integrally formed by, for example, silicon.

The first movable portion 3 is formed in, for example, a rectangular plate shape. The second movable portion 4 is formed in, for example, a rectangular ring shape so as to surround the first movable portion 3 through a gap when viewed from an optical axis direction A. The support portion 2 is formed in, for example, a rectangular frame shape so as to surround the second movable portion 4 through a gap when viewed from the optical axis direction A. That is, the support portion 2 is formed in a frame shape so as to surround the first movable portion 3 and the second movable portion 4 when viewed from the optical axis direction A.

The first movable portion 3 is connected to the second movable portion 4 through the pair of first connecting portions 5 so as to be swingable around a first axis X1. That is, the first movable portion 3 is supported by the support portion 2 so as to be swingable around the first axis X1. The first movable portion 3 includes a first portion 31 and a second portion 32. The first portion 31 is formed in, for example, a circular shape when viewed from the optical axis direction A. The second portion 32 is formed in, for example, a rectangular shape when viewed from the optical axis direction A. The first portion 31 is surrounded by the second portion 32 when viewed from the optical axis direction A and is connected to the second portion 32 through a plurality of (here, two) connection portions 33. That is, a gap is formed between the first portion 31 and the second portion 32 except for the plurality of connection portions 33.

The connection portion 33 is located at the center portion of two sides intersecting a second axis X2 in the inner edge of the second portion 32 having, for example, a rectangular shape. That is, here, the connection portion 33 is located on the second axis X2. The first portion 31 may be connected to the second portion 32 in the direction along at least the second axis X2. The second movable portion 4 is connected to the support portion 2 through the pair of second connecting portions 6 so as to be swingable around the second axis X2. That is, the second movable portion 4 is supported by the support portion 2 so as to be swingable around the second axis X2. The first axis X1 and the second axis X2 are perpendicular to the optical axis direction A and intersect each other (here, orthogonal to each other). Furthermore, the first portion 31 may be formed in a rectangular shape or a polygonal shape when viewed from the optical axis direction A. Further, the first portion 31 may be formed in a circular shape (for example, an oval shape) when viewed from the optical axis direction A. The second portion 32 may be formed in a ring shape or a polygonal shape of a pentagon or more when viewed from the optical axis direction A.

The pair of first connecting portions 5 are disposed on the first axis X1 so as to interpose the first movable portion 3 in the gap between the second movable portion 4 and the second portion 32 of the first movable portion 3. Each of the first connecting portions 5 functions as a torsion bar. The pair of second connecting portions 6 are disposed on the second axis X2 so as to interpose the second movable portion 4 in the gap between the second movable portion 4 and the support portion 2. Each of the second connecting portions 6 functions as a torsion bar.

The mirror 7 is provided in the first portion 31 of the first movable portion 3. The mirror 7 is formed in one surface of the first portion 31 (a surface on the side of the window member 44) so as to include an intersection point between the first axis X1 and the second axis X2. The mirror 7 is formed in a circular, oval, or rectangular film shape by, for example, a metal material such as aluminum, aluminum-based alloy, gold, or silver and the center of the mirror 7 matches the intersection point between the first axis X1 and the second axis X2 when viewed from the optical axis direction A. In this way, since the mirror 7 is provided in the first portion 31 connected to the second portion 32 through the plurality of connection portions 33, it is possible to suppress deformation such as bending in the mirror 7 even when the first movable portion 3 swings around the first axis X1 at the resonance frequency level.

Further, the MEMS mirror 1 includes a first driving coil (coil) 11, a second driving coil (coil) 12, wirings 15a and 15b, wirings 16a and 16b, electrode pads 21a and 21b, and electrode pads 22a and 22b. Furthermore, in FIG. 2, for convenience of description, the first driving coil 11 and the second driving coil 12 are indicated by the one-dotted chain line and the wirings 15a and 15b and the wirings 16a and 16b are indicated by the solid line.

The first driving coil 11 is provided in the second portion 32 of the first movable portion 3. The first driving coil 11 is wound in a spiral shape a plurality of times in the outer area (that is, the second portion 32) of the mirror 7 when viewed from the optical axis direction A. A magnetic field generated by the magnet portion 50 acts on the first driving coil 11.

The first driving coil 11 is disposed in a groove formed in the surface of the first movable portion 3. That is, the first driving coil 11 is embedded in the first movable portion 3. One end of the first driving coil 11 is connected to the electrode pad 21a through the wiring 15a. The wiring 15a extends from the first movable portion 3 to the support portion 2 through one first connecting portion 5, the second movable portion 4, and one second connecting portion 6. The wiring 15a and the electrode pad 21a are integrally formed by, for example, a metal material such as tungsten, aluminum, gold, silver, copper, and aluminum-based alloy. Furthermore, the first driving coil 11 and the wiring 15a are connected to each other.

The other end of the first driving coil 11 is connected to the electrode pad 21b through the wiring 15b. The wiring 15b extends from the first movable portion 3 to the support portion 2 through the other first connecting portion 5, the second movable portion 4, and the other second connecting portion 6. The wiring 15b and the electrode pad 21b are integrally formed by, for example, a metal material such as tungsten, aluminum, gold, silver, copper, and aluminum-based alloy. Furthermore, the first driving coil 11 and the wiring 15b are connected to each other.

The second driving coil 12 is provided in the second movable portion 4. The second driving coil 12 is wound in a spiral shape in the second movable portion 4. A magnetic field generated by the magnet portion 50 acts on the second driving coil 12. The second driving coil 12 is disposed inside a groove formed in the surface of the second movable portion 4. That is, the second driving coil 12 is embedded in the second movable portion 4.

One end of the second driving coil 12 is connected to the electrode pad 22a through the wiring 16a. The wiring 16a extends from the second movable portion 4 to the support portion 2 through one second connecting portion 6. The wiring 16a and the electrode pad 22a are integrally formed by, for example, a metal material such as tungsten, aluminum, gold, silver, copper, and aluminum-based alloy. Furthermore, the second driving coil 12 and the wiring 16a are connected to each other.

The other end of the second driving coil 12 is connected to the electrode pad 22b through the wiring 16b. The wiring 16b extends from the second movable portion 4 to the support portion 2 through the other second connecting portion 6. The wiring 16b and the electrode pad 22b are integrally formed by, for example, a metal material such as tungsten, aluminum, gold, silver, copper, and aluminum-based alloy. Furthermore, the second driving coil 12 and the wiring 16b are connected to each other.

An operation of the movable mirror portion 10 of the MEMS mirror 1 will be exemplified. As a first example, a driving current of a high frequency is applied to the first driving coil 11. At this time, since a magnetic field generated by the magnet portion 50 acts on the first driving coil 11, a Lorentz force is generated in the first driving coil 11. Accordingly, the first movable portion 3 is swung around the first axis X1 at, for example, the resonance frequency level.

Further, a certain magnitude of a driving current is applied to the second driving coil 12. At this time, since a magnetic force generated by the magnet portion 50 acts on the second driving coil 12, a Lorentz force is generated in the second driving coil 12. Accordingly, the second movable portion 4 is rotated around the second axis X2 in response to, for example, the magnitude of the driving current and is stopped in that state. Accordingly, according to the MEMS mirror 1, it is possible to scan light from a predetermined light source while reflecting the light by the mirror 7. In the first example, the first movable portion 3 is swung at the resonance frequency and the second movable portion 4 is used statically.

As a second example, similarly to the operation of the first movable portion 3 of the first example, the first movable portion 3 is swung in response to the resonance frequency when a driving current of a high frequency is applied to the first driving coil 11 and the second movable portion 4 is swung in response to the resonance frequency when a driving current of a high frequency is applied to the second driving coil 12. In this way, in the second example, both the first movable portion 3 and the second movable portion 4 are swung at the resonance frequency.

As a third example, similarly to the operation of the second movable portion 4 of the first example, the first movable portion 3 is swung around the first axis X1 and is stopped in response to the magnitude of the driving current when a certain magnitude of a driving current is applied to the first driving coil 11 and the second movable portion 4 is swung around the second axis X2 and is stopped in response to the magnitude of the driving current when a certain magnitude of a driving current is applied to the second driving coil 12. In this way, in the third example, both the first movable portion 3 and the second movable portion 4 are used statically.

As a fourth example, when a driving current of a high frequency is applied to the first driving coil 11, for example, in a case in which the second movable portion 4 is not provided, only the first movable portion 3 is swung in response to the resonance frequency. Further, as a fifth example, the first movable portion 3 is rotated around the first axis X1 and is stopped in response to the magnitude of the driving current when a certain magnitude of a driving current is applied to the first driving coil 11 in the same case. In the fourth example and the fifth example, only the first movable portion 3 is swung or used statically.

Furthermore, as illustrated in FIG. 4, a concave portion 42c is formed in the main surface 42a of the base 42 so as to face the first movable portion 3 and the second movable portion 4. Further, the bottom surface of the concave portion 42c is provided with a concave portion 42d. The first movable portion 3 and the second movable portion 4 are swingable so as not to interfere with the base 42 by the concave portion 42d.

Again, FIG. 3 is referred. As illustrated in FIG. 3, the magnet portion 50 generates a magnetic field acting on the mirror unit 40 (the MEMS mirror 1). The magnet portion 50 includes an upper surface 50a, a bottom surface 50b which is on the side opposite to the upper surface 50a, and a side surface 50s which extends from the upper surface 50a to the bottom surface 50b and connects the upper surface 50a and the bottom surface 50b to each other. The magnet portion 50 has a polygonal columnar shape. Here, the magnet portion 50 has a hexagonal columnar shape. Thus, the upper surface 50a and the bottom surface 50b have a hexagonal shape and the side surface 50s has a hexagonal ring shape. The upper surface 50a and the bottom surface 50b are substantially parallel to each other.

The magnet portion 50 is obtained by combining a plurality of magnets. Here, the magnet portion 50 includes a first magnet 51 and a pair of second magnets 52 and 53 which are disposed with the first magnet interposed therebetween. The first magnet 51 has a polygonal columnar shape (here, a square columnar shape) extending from the upper surface 50a to the bottom surface 50b. Thus, the end surface of the first magnet 51 forms a part of the area of the upper surface 50a and the bottom surface 50b. Each of the second magnets 52 and 53 has a polygonal columnar shape (here, a triangular columnar shape) extending from the upper surface 50a to the bottom surface 50b. Thus, the end surfaces of the second magnets 52 and 53 form a part of the area of the upper surface 50a and the bottom surface 50b.

The first magnet 51 and the second magnets 52 and 53 are arranged so that the magnetic poles are in a Halbach array (that is, the magnet portion 50 has a Halbach structure). Here, the second magnet 52 is disposed so that a first magnetic pole (for example, N pole) is located on the bottom surface 50b side and a second magnetic pole (for example, S pole) is located on the upper surface 50a side. The second magnet 53 is disposed in a direction opposite to the second magnet 52. That is, the second magnet 53 is disposed so that a first magnetic pole is located on the upper surface 50a side and a second magnetic pole is located the bottom surface 50b side. Meanwhile, the first magnet 51 is disposed so that a first magnetic pole is located on the second magnet 53 side and a second magnetic pole is located on the second magnet 52 side.

The first magnet 51 and the second magnets 52 and 53 are arranged in an array of the magnetic poles and are combined. For this reason, a force acts on the first magnet 51 in a direction from the upper surface 50a toward the bottom surface 50b by attractive and repulsive forces between magnetic poles. Meanwhile, a force acts on the second magnets 52 and 53 in a direction from the bottom surface 50b toward the upper surface 50a. Thus, a configuration for integrally holding the magnet portion 50 is required. In the embodiment, the package 60 has that function.

As illustrated in FIGS. 1 to 3, the package 60 accommodates the magnet portion 50. The package 60 includes a bottom wall portion 61, a side wall portion 62, and a regulation portion 63. The bottom wall portion 61, the side wall portion 62, and the regulation portion 63 are integrally formed. The package 60 has a rectangular parallelepiped shape as a whole. The bottom wall portion 61 is formed in a rectangular flat plate shape. The bottom wall portion 61 contacts the bottom surface 50b of the magnet portion 50 and supports the bottom surface 50b.

The side wall portion 62 erects along the outer edge of the bottom wall portion 61. Thus, here, the side wall portion 62 is formed in a rectangular ring shape. The side wall portion 62 contacts the side surface 50s of the magnet portion 50 and supports the side surface 50s. The regulation portion 63 is provided on the upper surface 50a of the magnet portion 50. The regulation portion 63 contacts the upper surface 50a of the magnet portion 50 and supports the upper surface 50a. The regulation portion 63 regulates the movement of the magnet portion 50 (for example, the second magnets 52 and 53) in a direction from the bottom surface 50b toward the upper surface 50a. Accordingly, the package 60 mechanically and integrally holds the magnet portion 50 against a force acting on the first magnet 51 and a force acting on the second magnets 52 and 53 as a whole.

The regulation portion 63 continuously extends from the side wall portion 62 so as to protrude from the side wall portion 62 toward the upper surface 50a of the magnet portion 50 between the upper surface 50a of the magnet portion 50 and an end portion on the side opposite to the bottom wall portion 61 in the side wall portion 62. That is, the regulation portion 63 extends from the connection portion between the upper surface 50a and the side surface 50s of the magnet portion 50 toward the inside of the upper surface 50a. The regulation portion 63 does not extend over the entire upper surface 50a and includes an inner edge 63e on the upper surface 50a.

Then, the mirror unit 40 is placed on the regulation portion 63 and is supported by the regulation portion 63. That is, the mirror unit 40 is supported on the upper surface 50a by the package 60 (particularly, the regulation portion 63). The back surface 42b of the base 42 of the mirror unit 40 faces the upper surface 50a and contacts the regulation portion 63. The base 42 is bonded to the regulation portion 63 by, for example, an adhesive resin or the like.

With such a support structure, a portion for placing the mirror unit 40 in the regulation portion 63 and a relaxation layer S formed as an air layer 63d corresponding to the height of the regulation portion 63 are interposed between the mirror unit 40 (the back surface 42b) and the upper surface 50a of the magnet portion 50. That is, the relaxation layer S for relaxing the stress of the magnet portion 50 is provided between the mirror unit 40 and the upper surface 50a. The air layer 63d is formed in a space defined by the inner edge 63e of the regulation portion 63. Accordingly, in the optical module 100 using the magnet portion 50 with a Halbach structure, the transmission of stress from the magnet portion 50 to the mirror unit 40 is suppressed and the tilting of the mirror unit 40 is suppressed.

Furthermore, the optical module 100 further includes a connector 70 and a wiring portion 71 connected to the connector 70. The connector 70 is embedded in the side wall portion 62 of the package 60. The wiring portion 71 extends from the connector 70 and is connected to the optical module 100 (for example, the base 42) through a release portion 63p of the regulation portion 63. A wiring for electrically connecting the wiring portion 71 and the MEMS mirror 1 to each other is formed inside the base 42. The wiring and the MEMS mirror 1 are electrically connected to each other by, for example, a wire W.

Figure 6:
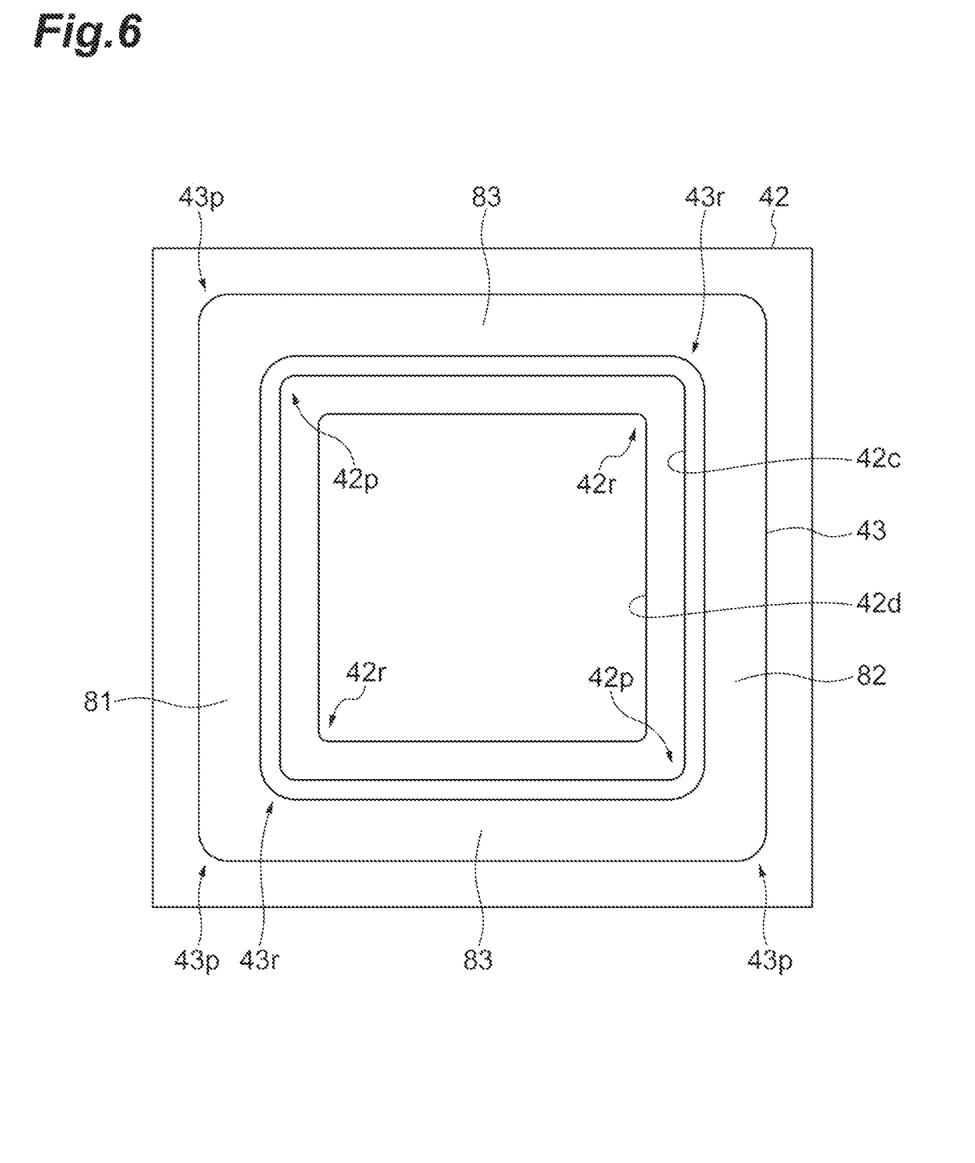
FIG. 6 is a partial plan view of a mirror unit illustrated in FIG. 4.

Next, the mirror unit 40 will be described in detail with reference to FIGS. 4 and 6. FIG. 6 is a partial plan view of the mirror unit illustrated in FIG. 4. In FIG. 6, only the base 42 and the frame member 43 are illustrated. As illustrated in FIGS. 4 and 6, the frame member 43 includes a first wall portion 81, a second wall portion 82, and a pair of third wall portions 83 provided on the main surface 42a of the base 42. Here, the frame member 43 is integrally formed in a rectangular ring shape by the first wall portion 81, the second wall portion 82, and the third wall portion 83. Each of the first wall portion 81, the second wall portion 82, and the third wall portion 83 forms a side portion of the frame member 43.

The first wall portion 81 and the second wall portion 82 face each other. More specifically, the first wall portion 81 and the second wall portion 82 extend in parallel while being separated from each other. Hereinafter, a direction extending from the first wall portion 81 to the second wall portion 82 is referred to as a first direction and a direction intersecting the main surface 42a is referred to as a second direction. The first wall portion 81 includes a first top surface 81s on the side opposite to the main surface 42a. The first top surface 81s is inclined such that a distance from the main surface 42a increases toward the second wall portion 82.

Thus, the height of the first wall portion 81 from the main surface 42a is the highest on the side of the second wall portion 82 and is the lowest on the side opposite to the second wall portion 82. When a minimum value H81 of the height of the first wall portion 81 is 0, the first wall portion 81 has a triangular cross-sectional shape in the short direction. Meanwhile, when the minimum value H81 is larger than 0, the first wall portion 81 has a trapezoidal cross-sectional shape in the short direction (a trapezoidal shape in the drawing). A length L81a of the first top surface 81s in the first direction is longer than the minimum value H81.

The second wall portion 82 includes a second top surface 82s on the side opposite to the main surface 42a. The second top surface 82s is inclined such that a distance from the main surface 42a decreases toward the first wall portion 81. Thus, the height of the second wall portion 82 from the main surface 42a is the lowest on the side of the first wall portion 81 and is the highest on the side opposite to the first wall portion 81. The second wall portion 82 has a trapezoidal cross-sectional shape in the short direction. The height of the first wall portion 81 from the main surface 42a is set to be lower than the height of the second wall portion 82 from the main surface 42a. As an example, a maximum value of the height of the first wall portion 81 from the main surface 42a is smaller than a minimum value of the second wall portion 82 from the main surface 42a. Further, an average value of the height of the first wall portion 81 from the main surface 42a may be lower than an average value of the height of the second wall portion 82 from the main surface 42a.

The pair of third wall portions 83 face each other and extend in parallel while being separated from each other. The third wall portion 83 connects the first wall portion 81 and the second wall portion 82 to each other at both ends of the first wall portion 81 in the longitudinal direction and both ends of the second wall portion 82 in the longitudinal direction. The third wall portion 83 includes a third top surface 83s on the side opposite to the main surface 42a. The third top surface 83s is inclined such that a distance from the main surface 42a increases from the first wall portion 81 to the second wall portion 82. Thus, the height of the third wall portion 83 from the main surface 42a is the lowest on the side of the first wall portion 81 and is the highest on the side of the second wall portion 82. The third wall portion 83 has a trapezoidal shape in the side view from the short direction.

The first top surface 81s, the second top surface 82s, and the third top surface 83s are flush with one another and define a single plane. The window member 44 is bonded to the first top surface 81s, the second top surface 82s, and the third top surface 83s through the bonding material 45 and is inclined such that a distance from the main surface 42a increases from the first wall portion 81 to the second wall portion 82. In other words, the first top surface 81s, the second top surface 82s, and the third top surface 83s are inclined at an angle corresponding to the inclination of the window member 44. Here, the window member 44 contacts a part or all of the third top surface 83s, but may not be bonded to the third top surface 83s. That is, the window member 44 may be bonded to at least the first top surface 81s and the second top surface 82s.

Further, each of the third wall portions 83 may be formed by a plurality of portions. When each of the third wall portions 83 is formed by a plurality of portions, a gap may be formed between the portions so that the portions are formed discontinuously. In this case, the third top surface 83s is also divided into a plurality of areas in a discontinuous manner in response to the gap. Meanwhile, even when each of the third wall portions 83 is formed by a single portion, the third top surface 83s may be divided into a plurality of areas by forming, for example, a concave portion such as a notch in the third top surface 83s. Further, the entirety of the third top surface 83s may not be inclined at an angle corresponding to the inclination of the window member 44. The third top surface 83s may be formed such that a line connecting two points in the third top surface 83s is inclined at an angle corresponding to the inclination of the window member 44.

The same applies to the first top surface 81s and the second top surface 82s. That is, the first top surface 81s and the second top surface 82s may be also provided with a notch or the like so as to be divided into a plurality of areas. Further, the entirety of the first top surface 81s and the second top surface 82s may not be inclined in response to the inclination of the window member 44. The first top surface 81s and the second top surface 82s may be formed such that a line connecting two points thereof is inclined at an angle corresponding to the inclination of the window member 44. In this case, an area inclined in response to the inclination of the window member 44 in the first top surface 81s and the second top surface 82s may be bonded to the window member 44. In other words, in this case, an area bonded to the window member 44 in the first top surface 81s and the second top surface 82s may be inclined at an angle in response to the inclination angle of the window member 44.

Here, the length L81a of the first top surface 81s also including a case in which a protrusion or a notch is formed in the first top surface 81s is a length from an intersection point between a line orthogonal to a bottom surface 81r of the first wall portion 81 and passing through the inner edge of the first wall portion 81 and an area along the inclination angle of the window member 44 in the first top surface 81s to an intersection point between a line orthogonal to the bottom surface 81r of the first wall portion 81 and passing through the outer edge of the first wall portion 81 and an extension line of an area along the inclination angle. Alternatively, the length L81a of the first top surface 81s is a length from an intersection point between a line orthogonal to the bottom surface 81r of the first wall portion 81 and passing through the inner edge of the first wall portion 81 and an extension line of a line along the inclination angle of the window member 44 in the first top surface 81s to an intersection point between a line orthogonal to the bottom surface 81r of the first wall portion 81 and passing through the outer edge of the first wall portion 81 and an area along the inclination angle. Furthermore, the bottom surface 81r of the first wall portion 81 is a surface (bonded to the main surface 42a) facing the main surface 42a of the base 42 in the first wall portion 81. Further, a length L81r of the bottom surface 81r of the first wall portion 81 in the first direction from the first wall portion 81 toward the second wall portion 82 is longer than the minimum value H81 of the height of the first wall portion 81 from the main surface 42a.

A thickness T44 of the window member 44 is thicker than the minimum value H81 of the height of the first wall portion 81 from the main surface 42a. Furthermore, the thickness T44 of the window member 44 is a dimension of the window member 44 in a direction intersecting (orthogonal to) the first top surface 81s or the like. Furthermore, a lens or the like may be formed in a part of the window member 44 so that a portion having a different thickness is formed. That is, the thickness T44 of the window member 44 is uniform in the embodiment illustrated in the drawings, but may be non-uniform. In that case, the thickness of the portion bonded to the first wall portion 81 in the window member 44 may be thicker than the minimum value H81. Further, there is also a case in which the maximum thickness of the window member 44 is thicker than the minimum value H81. As an example, the average thickness of the window member 44 may be larger than the minimum value H81.

Here, a length L81b in the first direction of the portion bonded to the window member 44 in the first top surface 81s (the portion overlapping the window member 44 when viewed from a direction intersecting the first top surface 81s) is longer than the minimum value H81. Meanwhile, here, the length L81b in the first direction of the portion bonded to the window member 44 in the first top surface 81s is shorter than the length L81a in the first direction of the entirety of the first top surface 81s. That is, here, most of the first top surface 81s on the side of the second wall portion 82 is used for the bonding to the window member 44, but a part of the first top surface 81s on the side opposite to the second wall portion 82 is exposed from the window member 44.

Furthermore, here, the width of the frame member 43 (the distance between an inner surface 43s and the outer surface on the side opposite to the inner surface 43s) is larger than the thickness T44 of the window member 44. Accordingly, the length L81a of the first top surface 81s is larger than the thickness T44 of the window member 44. As described above, there is a case in which the thickness of the window member 44 is non-uniform. Thus, the length L81a of the first top surface 81s may be longer than an average value of the thickness of the window member 44. In this way, when the width of the frame member 43 is set to be larger than the thickness T44 of the window member 44, the strength of the frame member 43 is improved. Further, here, the width of the frame member 43 is larger than the thickness of the base 42 (the distance between the main surface 42a and the back surface 42b). Accordingly, the strength of the frame member 43 is further improved.

As described above, the frame member 43 and the window member 44 are bonded to each other by the bonding material 45 such as low-melting glass. Accordingly, the bonding material 45 is interposed between the frame member 43 (the first top surface 81s, the second top surface 82s, and the third top surface 83s) and the window member 44 and the bonding end portion between the frame member 43 and the window member 44 is provided with fillets 45a and 45b of the bonding material 45. Specifically, a portion on the side of the window member 44 in the inner surface 43s of the frame member 43 is provided with the fillet 45b and an outer surface 44s of the window member 44 is provided with the fillet 45a.

Furthermore, a corner portion 43p of the outer surface of the frame member 43 and a corner portion 43r of the inner surface thereof are curved when viewed from the second direction. Here, the corner portions 43p and 43r are formed in an arc shape protruding toward the outside of the frame member 43 when viewed from the second direction. The corner portions 43p and 43r are a connection portion between the first wall portion 81 and the third wall portion 83 and a connection portion between the second wall portion 82 and the third wall portion 83.

Here, as described above, the main surface 42a of the base 42 is provided with the concave portion 42c. The MEMS mirror 1 is disposed in the concave portion 42c when viewed from the second direction. Here, the support portion 2 is disposed in the concave portion 42c and is supported by the bottom surface of the concave portion 42c. As described above, the bottom surface of the concave portion 42c is further provided with the concave portion 42d. Here, the movable mirror portion 10 is disposed in the concave portion 42d when viewed from the second direction. A corner portion 42p of the concave portion 42c and a corner portion 42r of the concave portion 42d are curved when viewed from the second direction. The corner portions 42p and 42r are formed in an arc shape protruding toward the outside of the base 42 when viewed from the second direction.

As described above, in the mirror unit 40, the window member 44 that provides the light entrance/exit portion is inclined such that a distance from the main surface 42a of the base 42 increases from the first wall portion 81 of the frame member 43 supporting the window member 44 to the second wall portion 82. Thus, noise light generated by the reflection in the window member 44 is difficult to affect the scan of the reflected light in the movable mirror portion 10 and noise is suppressed.

Meanwhile, in such a mirror unit, the package covering the movable mirror is necessary to maintain the movable mirror in an airtight state or to prevent dust and the thicker thickness of the window member of the package is easier to ensure the airtightness and is more resistant to an external impact. On the other hand, if the height of the side wall of the package is high, the light reflected by the movable mirror when the deflection angle of the movable mirror is large is blocked by the side wall of the package. Therefore, the reflected light is not blocked even when the deflection angle of the movable mirror is large by setting the height of the frame-shaped member constituting the side wall of the package to be small. It is advantageous that the movable mirror portion (the mirror surface) is as large as possible. However, when the movable mirror portion is large, the size of the mirror device increases and hence the size of the frame member surrounding the mirror device also increases. When the window member and the frame member are large while maintaining the inclination angle of the window member inclined from the viewpoint of suppressing noise, a difference in height between the first wall portion and the second wall portion increases. Then, since the balance of the strength of the frame member becomes poor, there is concern that the strength is deteriorated as a whole.

In contrast, in the mirror unit 40, the window member 44 that is thicker than the minimum value H81 of the height of the first wall portion 81 is bonded to the frame member 43 so that the balance of the strength is maintained as a whole and deterioration of strength is suppressed. Further, in the mirror unit 40, the length L81a of the first top surface 81s of the first wall portion 81 in the first direction from the first wall portion 81 toward the second wall portion 82 is set to be longer than the minimum value H81 of the height of the first wall portion 81. Accordingly, it is possible to suppress the first wall portion 81 from being deformed such that both ends corresponding to the connection portions with the third wall portion 83 in the first wall portion 81 or the center portion between both ends of the first wall portion 81 is displaced in the first direction. Further, the window member 44 that is thicker than the minimum value H81 of the height of the first wall portion 81 is bonded to the first wall portion 81 (the frame member 43) so that the deformation of the first wall portion 81 in the height direction is also suppressed. For at least the above-described reasons, the mirror unit 40 also improves the reliability.

Further, in the mirror unit 40, the length L81b in the first direction of the portion bonded to the window member 44 in the first top surface 81s is longer than the minimum value H81. For this reason, it is possible to further suppress the first wall portion 81 from being deformed such that both ends corresponding to the connection portions with the third wall portion 83 in the first wall portion 81 or the center portion between both ends of the first wall portion 81 is displaced in the first direction. Thus, the reliability is further improved.

Further, in the mirror unit 40, the length L81b in the first direction of the portion bonded to the window member 44 in the first top surface 81s is shorter than the length L81a in the first direction of the entirety of the first top surface 81s. For this reason, since a marginal portion (not contacting the window member 44) not forming a joint with the window member 44 occurs in a relative low portion of the first wall portion 81, the damage of the first wall portion 81 is suppressed. Thus, the reliability is further improved.

Further, in the mirror unit 40, the main surface 42a of the base 42 is provided with the concave portion 42c in which the MEMS mirror 1 is disposed when viewed from the second direction intersecting the main surface 42a. Then, the corner portion 42p of the concave portion 42c is curved when viewed from the second direction. For this reason, stress applied from the base 42 to the MEMS mirror 1 is relaxed. Thus, the reliability is further improved. Furthermore, in the mirror unit 40, since the main surface 42a of the base 42 is provided with the concave portion 42c, a surface tension acts on the bonding material 46 in the vicinity of the step of the concave portion 42c. Accordingly, it is possible to suppress the bonding material 46 from reaching the MEMS mirror 1.

Further, in the mirror unit 40, a portion on the side of the window member 44 in the inner surface 43s of the frame member 43 and the outer surface 44s of the window member 44 are provided with the fillets 45a and 45b of the bonding material 45 between the frame member 43 and the window member 44. For this reason, since the frame member 43 and the window member 44 are strongly bonded to each other in the extension direction of the joint portion between the frame member 43 and the window member 44, an occurrence of a deviation is suppressed. Thus, the reliability is further improved. Furthermore, even when only one of the fillets 45a and 45b is formed, an occurrence of a deviation is suppressed since the frame member 43 and the window member 44 are strongly bonded to each other, but both the fillets 45a and 45b may be formed.

Further, in the mirror unit 40, the length L81r of the bottom surface 81r of the first wall portion 81 in the first direction from the first wall portion 81 toward the second wall portion 82 is longer than the minimum value H81 of the height of the first wall portion 81 from the main surface 42a. For this reason, it is possible to further suppress the first wall portion 81 from being deformed such that both ends corresponding to the connection portions with the third wall portion 83 in the first wall portion 81 or the center portion between both ends of the first wall portion 81 is displaced in the first direction. Thus, the reliability is further improved.

The above-described embodiment describes an embodiment of the optical unit. Thus, the optical unit is not limited to the mirror unit 40 and can be modified arbitrarily.

For example, in the mirror unit 40, there is also a case in which the length L81b in the first direction of the portion bonded to the window member 44 in the first top surface 81s is shorter than the minimum value H81 in response to the conditions such as the minimum value H81 of the height of the first wall portion 81 from the main surface 42a and the thickness T44 of the window member 44. Similarly, the length L81b in the first direction of the portion bonded to the window member 44 in the first top surface 81s may not be shorter than the length L81a in the first direction of the entirety of the first top surface 81s (the length L81b and the length L81a may be equal to each other). That is, the maximum value of the length L81b is the length L81a.

Further, the bonding end portion between the base 42 and the frame member 43 can be provided with the fillet of the bonding material 46. More specifically, an end portion on the side of the base 42 in the inner surface 43s of the frame member 43 and an end portion on the side of the base 42 in the outer surface on the side opposite to the inner surface 43s of the frame member 43 can be provided with the fillet of the bonding material 46. When the fillet is formed in this way, a deviation between the base 42 and the frame member 43 in the extension direction of the joint portion between the base 42 and the frame member 43 is suppressed.

Further, in the above-described embodiment, an example in which the MEMS mirror 1 is hermetically sealed by the mirror package 41 has been exemplified, but a part of the mirror package 41 (for example, a part of the base 42 or the frame member 43) may be provided with an air hole communicating with the outside.

Further, the mirror device may be of an electrostatic type or a piezoelectric type other than the electromagnetically driven MEMS mirror 1 described above.

REFERENCE SIGNS LIST

1: MEMS mirror (mirror device), 10: movable mirror portion, 40: mirror unit (optical unit), 42: base, 42a: main surface, 42c: concave portion, 43: frame member, 43s: inner surface, 43p, 43r: corner portion, 44: window member, 44s: outer surface, 45: bonding material, 45a, 45b: fillet, 81: first wall portion, 81s: first top surface, 82: second wall portion, 82s: second top surface, 83: third wall portion, 83s: third top surface.

What is claimed is:

1. An optical unit comprising:
    a base which includes a main surface;
    a mirror device which includes a movable mirror portion;
    a frame member that is provided on the main surface side so as to surround the mirror device when viewed from a first direction orthogonal to the main surface; and
    a window member that is bonded to the frame member,
    wherein the window member is inclined with respect to the mirror surface of the movable mirror portion when viewed from a second direction orthogonal to the first direction, and
    wherein an inner surface of the frame member has a curved surface shape when viewed from the first direction.

2. The optical unit according to claim 1,
    wherein a top surface of the frame member is inclined at an angle corresponding to the inclination of the window member when viewed from the second direction.

3. The optical unit according to claim 1,
    wherein a thickness of the window member is thicker than a minimum value of a height of the frame member from the main surface.

4. The optical unit according to claim 1,
    wherein a length of a top surface of the frame member in a third direction orthogonal to the first direction and the second direction is longer than a minimum value of a height of the frame member from the main surface.

5. The optical unit according to claim 1,
    wherein, in a third direction orthogonal to the first direction and the second direction, a length of a portion of a top surface of the frame member which is bonded to the window member is longer than a minimum value of a height of the frame member from the main surface.

6. The optical unit according to claim 1,
    wherein, in a third direction orthogonal to the first direction and the second direction, a length of a portion of a top surface of the frame member which is bonded to the window member is shorter than a length of the entirety of the top surface.

7. The optical unit according to claim 1,
    wherein the main surface is provided with a concave portion in which the mirror device is disposed, and
    wherein a corner portion of the concave portion has a curved surface shape when viewed from the first direction.

8. The optical unit according to claim 1,
    wherein a portion on the side of the window member in an inner surface of the frame member and an outer side surface of the window member are provided with a fillet of a bonding material between the frame member and the window member.

9. The optical unit according to claim 1,
    wherein a length of a bottom surface of the frame member facing the main surface in a third direction orthogonal to the first direction and the second direction is longer than a minimum value of a height of the frame member from the main surface.

10. The optical unit according to claim 1,
    wherein an outer side surfaces of the frame member has a curved surface shape.

11. The optical unit according to claim 1,
    wherein a bonding portion between the frame member and the base is provided with a fillet of a boding material.

12. The optical unit according to claim 1,
    wherein a width of the frame member in a third direction orthogonal to the first direction and the second direction is larger than a thickness of the window member.

13. The optical unit according to claim 1,
    wherein a width of the frame member in a third direction orthogonal to the first direction and the second direction is larger than a thickness of the base.

14. The optical unit according to claim 1,
    wherein a thickness of the window member is larger than a thickness of the base.

15. The optical unit according to claim 1,
    wherein the frame member is formed in a rectangular frame shape.

* * * * *